United States Patent [19]

Hashimoto et al.

[11] Patent Number: 5,166,184
[45] Date of Patent: Nov. 24, 1992

[54] EPOXY RESIN, PROCESS FOR THE PREPARATION THEREOF AND PROCESS FOR THE PRODUCTION OF EPOXY FOAM

[75] Inventors: Michio Hashimoto, Chiba; Taira Harada, Ichihara; Yoshihisa Kiso, Iwakuni; Isao Kaneko, Funabashi; Gorou Suzuki, Ichihara, all of Japan

[73] Assignee: Mitsui Petrochemical Industries, Ltd., Tokyo, Japan

[21] Appl. No.: 873,685

[22] Filed: Apr. 24, 1992

Related U.S. Application Data

[63] Continuation of Ser. No. 362,384, Aug. 14, 1989, abandoned.

Foreign Application Priority Data

Oct. 13, 1987 [JP] Japan .................... 62-257945
Oct. 15, 1987 [JP] Japan .................... 62-261271

[51] Int. Cl.$^5$ ............................................. C08G 59/68
[52] U.S. Cl. .................................. 521/135; 521/178; 525/463; 528/98; 528/104
[58] Field of Search ............. 521/135, 178; 528/98, 528/104; 525/463

[56] References Cited

U.S. PATENT DOCUMENTS

| | | | |
|---|---|---|---|
| 3,098,056 | 7/1963 | Schnell et al. | 525/463 |
| 3,261,808 | 7/1966 | Schnell et al. | 528/88 |
| 4,308,185 | 12/1981 | Evans et al. | 525/63 |
| 4,373,034 | 2/1983 | Speranza et al. | 521/174 |
| 4,528,342 | 7/1985 | Wilson | 525/463 |
| 4,954,603 | 9/1990 | Takata et al. | 528/98 |

FOREIGN PATENT DOCUMENTS 438744 12/1967 Switzerland .

*Primary Examiner*—John Kight, III
*Assistant Examiner*—John M. Cooney, Jr.
*Attorney, Agent, or Firm*—Nixon & Vanderhye

[57] ABSTRACT

A normally liquid epoxy resin obtainable by reaction of a bisphenol based oligocarbonate having terminal phenolic hydroxyl groups with an epihalohydrin, followed by dehydrohalogenation. The epoxy resin is capable of forming a tough cured product having improved flexural strength and flexural modulus. A process for the production of an epoxy resin foam in which a polyepoxy compound is crosslinked and simultaneously foamed by the aid of carbonate oligomers having terminal phenolic hydroxyl groups. The product is highly flexible against compression, bending and warp.

6 Claims, 1 Drawing Sheet

EPOXY RESIN, PROCESS FOR THE PREPARATION THEREOF AND PROCESS FOR THE PRODUCTION OF EPOXY FOAM

This is a continuation of application Ser. No. 07/362,384, filed Aug. 14, 1989, now abandoned.

FIELD OF THE INVENTION

The present invention relates to an epoxy resin and a process for the preparation thereof, more particularly, it relates to an epoxy resin curable to excellent toughness and to a process for the preparation of the same.

The invention further relates to a process for the production of an epoxy foam, in particular to a process for producing an epoxy foam which is uniformly foamed and flexible without using a conventional foaming agent.

BACKGROUND OF THE INVENTION

Generally, epoxy resins and cured produces therefrom are widely used in applications as electric materials, paints, adhesives, civil engineering and construction materials and composite materials, and depending upon the particular use, various characteristics such as heat resistance, toughness, flexibility and chemical resistance are required.

Commercially available epoxy resins such as a glycidyl ether of Bisphenol A and a glycidyl ether of Bisphenol F are normally liquid. They are admixed with curing agents and optionally fillers, and are cured to various produces for various applications. Such cured products of diglycidyl ethers of Bisphenols A and F are, however unsatisfactory in flexural strength and in flexural modulus, and do not have sufficient roughness which is required in many applications.

Accordingly, in many applications where toughness is required, cured products of epoxy resins having a high epoxy equivalent such as those represented by phenoxy resins have heretofore been used. However, epoxy resins having high epoxy equivalent such as those represented by the phenoxy resins are normally solid, and thus, upon preparation of cured products it is necessary to dissolve the solid resins in an appropriate solvent. This is inconvenient when compared with normally liquid epoxy resins such as diglycidyl ethers of Bisphenols A and F with which curing agents and fillers may be directly admixed.

For the production of epoxy foams known in the art is a process in which a system comprising an epoxy resin and a curing agent, having a foaming agent (e.g. gases such as air and low boiling compounds such as pentane) introduced thereto is reacted and foamed at room temperature. Also known is a process in which a system comprising an epoxy resin and a curing agent, having a foaming agent (e.g. azobisisobutyronitrile and azodicarbonamide) added thereto is heated and foamed at an elevated temperature.

The epoxy foams produced by such known processes have, however, problems in that they are not uniform in their foamed structure resulting in brittleness, poor mechanical durability, and have some limitations in application. They do not work well for anticorrosive agents of metals, heat insulators and shock absorbers.

It is desired therefore to provide epoxy resin foams which are uniformly foamed, and excellent in heat resistance, in adhesiveness as well as in mechanical properties.

OBJECT OF THE INVENTION

An object of the invention is to provide an epoxy resin which is capable of providing rough cured products having increased flexural strength and flexural modulus, and which is normally liquid and thus easy to handle upon preparation of cured products.

A further object of the invention is to provide a process for the production of an epoxy resin foam which is uniformly foamed and highly flexible against compression, bending and warp, and which exhibit high mechanical durability when used in anticorrosive agents of metals, heat insulators and shock absorbers.

SUMMARY OF THE INVENTION

It has now been found that an epoxy resin derived from a certain carbonate having a special structure is normally liquid and is capable of providing tough cured products increased in flexural strength and modulus.

Thus, an epoxy resin according to the invention is represented by the general formula [I]

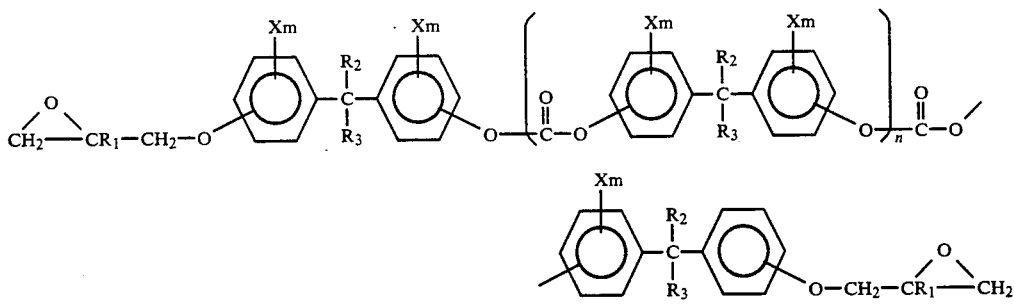

wherein $R_1$ is hydrogen and/or alkyl groups, $R_2$ and $R_3$ may be the same or different, and each represents hydrogen atom, a lower alkyl group and/or phenyl group, or when taken together $R_2$ and $R_3$ may form a ring, preferably a ring of the formula

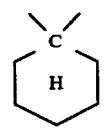

together with the carbon atom to which they are attached, X is a lower alkyl or a halogen atom, m is a number of substituents from 0 to 4, and n is from 0 to 5.

A process for the preparation of an epoxy resin represented by the general formula [I] according to the invention comprises reacting an oligocarbonate represented by the general formula [II]

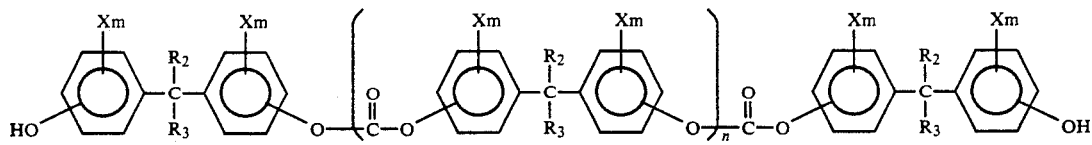

wherein $R_2$ and $R_3$ may be the same or different, and each represents hydrogen atom, a lower alkyl or phenyl, or when taken together $R_2$ and $R_3$ may form a ring, preferably a ring of the formula

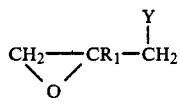

together with the carbon atom to which they are attached, X is a lower alkyl or a halogen atom, m is a number of substituents from 0 to 4, and n is from 0 to 5, with an eiphalohydrin represented by the general formula [III]

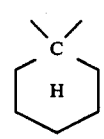

wherein $R_1$ is hydrogen a&om or an alkyl group and Y is a halogen atom, followed by dehydrohalogenation of the reaction product with an alkali thereby leading to ring closure.

A process for &he production of an epoxy resin foam according to the invention comprises reacting a polyepoxy compound having at least two epoxy groups in a molecule with a carbonate oligomer having terminal phenolic hydroxyl groups in the presence of a catalyst at a temperature of from 120° to 240° C.

The epoxy resins according to the invention are capable of providing tough cured products and are easy to handle upon preparation of cured products since they are normally liquid.

In the process for the production of an epoxy resin foam according to the invention, the carbonate oligomer serves as a crosslinking agent and accompanied with the formation of carbon dioxide which acts as a foaming agent. For this reason, the foaming proceeds uniformly in the resin and the foamed product is highly flexible against compression, bending and warp and also excellent in heat resistance and in its adhesion property. Further, since no additional foaming agent is required, the process is simple and economical.

DETAILED DESCRIPTION OF THE INVENTION EPOXY RESINS

Figure 1:
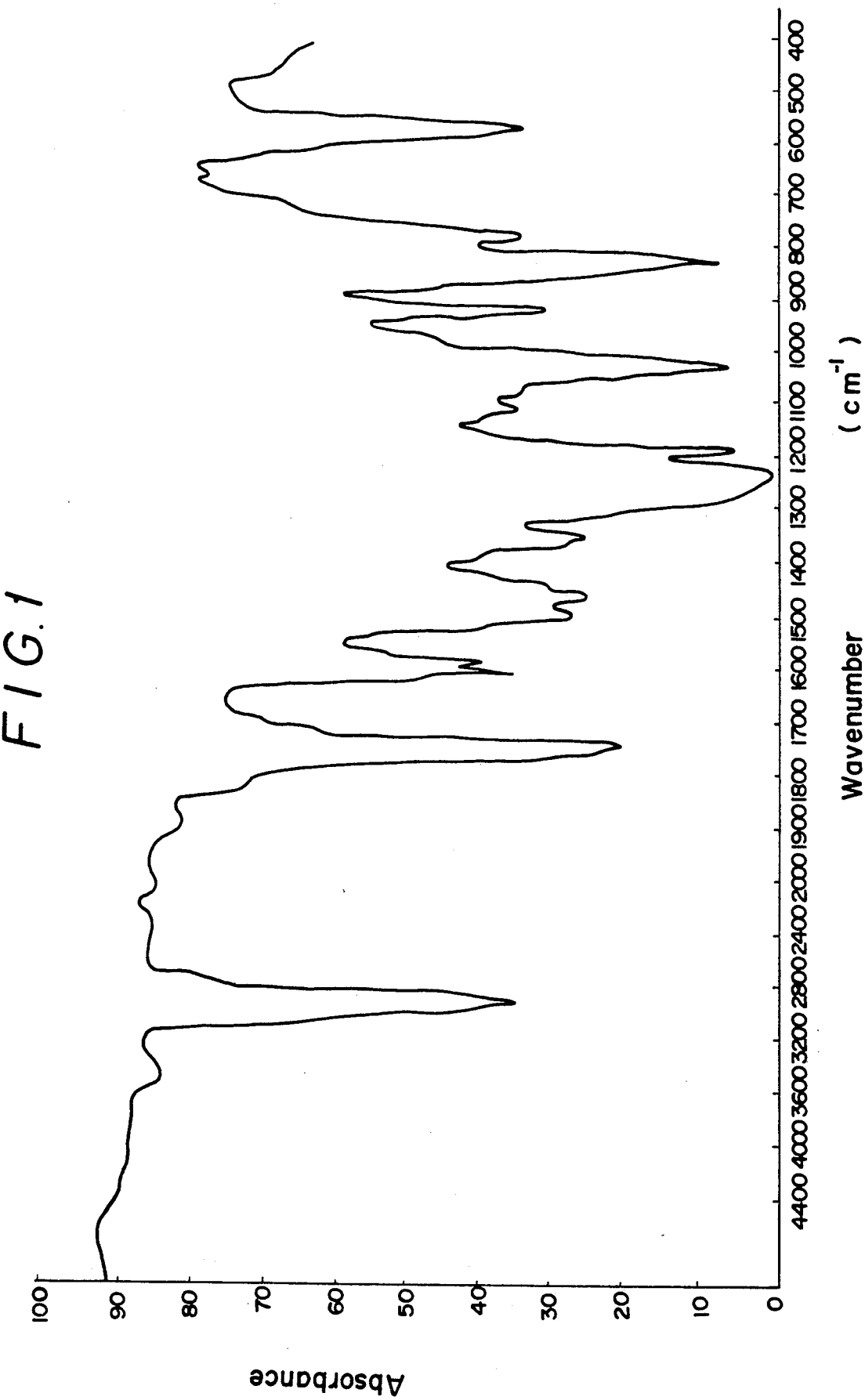
FIG. 1 is an infrared spectrum of an epoxy resin according to the invention prepared in Example 1.

The epoxy resin according to the present invention is represented by the general formula [I]

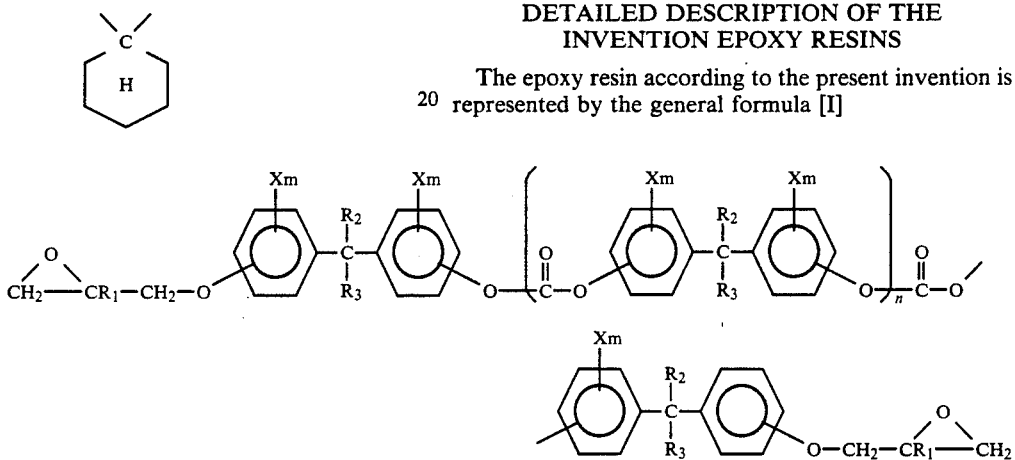

wherein $R_1$ is hydrogen atom and/or an alkyl group, $R_2$ and $R_3$ may be &he same or different, and each represents hydrogen atom, a lower alkyl group or phenyl group, or when taken together $R_2$ and $R_3$ may form a ring, preferably a ring of the formula together with the carbon atom to which they are attached, X is a lower alkyl group and/or a halogen atom, m is a number of substituents from 0 to 4, and n is from 0 to 5.

$R_1$ is hydrogen atom and/or an alkyl group such as methyl, ethyl, n-propyl, i-propyl and/or i butyl group. Of these, hydrogen atom and methyl group are preferred.

$R_2$ and $R_3$ may be the same or different, and each represents hydrogen atom, a lower alkyl and/or phenyl, or when taken together $R_2$ and $R_3$ may form a ring, preferably a ring of the formula

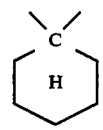

together with the carbon atom to which they are attached. Thus, $R_2$ and $R_3$ may form the following groups together with the carbon atom to which they are attached.

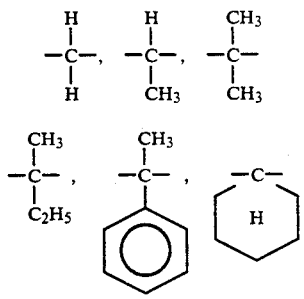

X is a lower alkyl group or halogen atom, including, for example, methyl, ethyl, propyl, n butyl, sec.-butyl and/or tert. butyl group, chlorine, bromine and iodine a&om. m is a number of substituents from 0 to 4. The plural ms may be the same or different n is a number of recurring units from 0 to 5.

A preferred epoxy resin is one represented by the general formula [I] wherein $R_1$ is hydrogen atom, $R_2$ and $R_3$ are methyl group, and m is 0. Thus, the preferred epoxy resins according to the invention can be represented by the formula

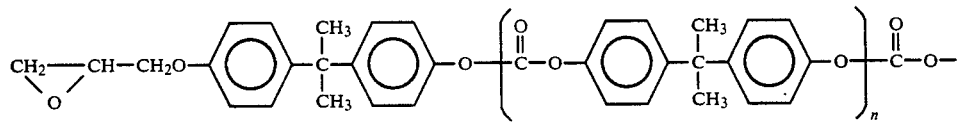

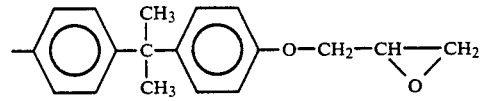

wherein A is a number from 0 to 5.

phenyl, or when taken together $R_2$ and $R_3$ may, form a ring, preferably a ring of the formula

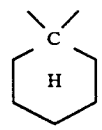

together with the carbon atom to which &hey are attached, X is a lower alkyl and/or halogen atom, m is a number of substituents from 0 to 4, and n is from 0 to 5, with an epihalohydrin represented by the general formula [III]

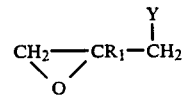

wherein $R_1$ is hydrogen atom and/or alkyl group and Y is a halogen atom, followed by dehydrohalogenation of the reaction product with an alkali thereby effecting ring closure.

STARTING OLIGOCARBONATE

The process for the preparation of an epoxy resin according to the invention starts with an oligocarbonate represent by the general formula [II]

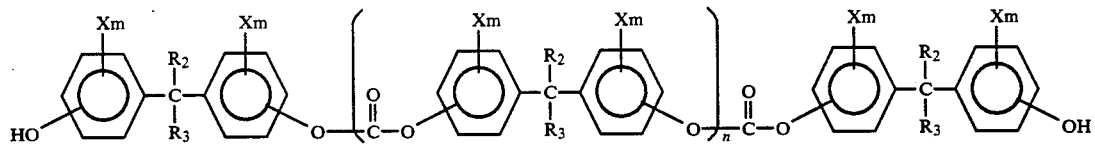

wherein $R_2$ and $R_3$ may be &he same or different, and each represents hydrogen atom, a lower alkyl group or phenyl group, or when taken together $R_2$ and $R_3$ may form a ring, preferably a ring of the formula

PREPARATION FOR EPOXY RESINS

The epoxy resins represented by the general formula [I] can be prepared by a process according to the invention which comprises reacting an oligocarbonate represented by the general formula [II]

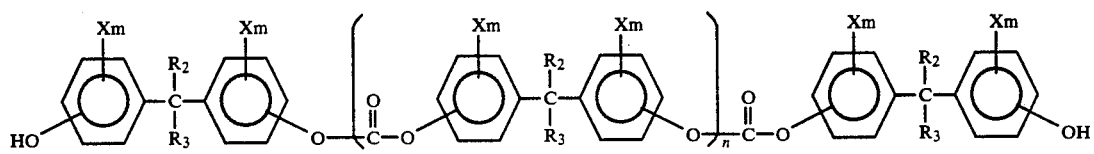

wherein $R_2$ and $R_3$ may be the same or different, and each represents hydrogen atom, a lower alkyl group or

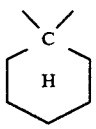

together with the carbon atom to which they are attached, X is a lower alkyl group and/or a halogen atom, m is a number of substituents from 0 to 4, and n is from 0 to 5.

$R_2$, $R_3$, X, m and n in the general formula [II] have the same meaning as those in the general formula [I].

As disclosed by A.T.Hegarty in "Comprehensive Organic Chemistry" edited by I.O.Sutherland, Pergamon Press, 1979, Parts 9 and 10, the starting oligocarbonate may readily be synthesized by reaction of a bisphenol such as Bisphenol A, Bisphenol F or 'Bisphenol AD' obtained from the reaction of phenol with acetaldehyde with phosgen, or by transesterification between the bisphenols mentioned above and the phenyl carbonates.

In the preparation of an oligocarbonate by reaction of a bisphenol with phosgen or by transesterification between a bisphenol and a phenyl carbonate, some bisphenol normally remains unreacted. It is not necessary to remove the unreacted bisphenol, but the oligocarbonate containing the unreacted bisphenol may be used as such in the process according to the invention.

EPIHALOHYDRINS

In the process according to the invention the oligocarbonate of the general formula [II] is reacted with an epihalohydrin of the general formula [III]

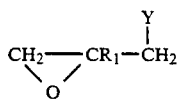

wherein $R_1$ is hydrogen atom or an alkyl group, and Y is a halogen.

$R_1$ in the general formula [III] has the same meaning as $R_1$ in the general formula [I]. Y is a halogen including, for example, chlorine, bromine and iodine with preference to chlorine.

REACTION CONDITIONS

In the process according to the invention the oligocarbonate of the general formula [II] is reacted with an excess molar amount of epihalohydrin of the general formula [III] in the presence of a catalyst such as a quarternary ammonium salt (e.g. tetramethylammonium chloride) or a quarternary phosphonium salt (e.g. triphenylmethylphosphonium bromide), preferably while keeping &he reaction medium anhydrous. The epihalohydrin is used preferably in an amount of from 2 to 20 moles, in particular from 3 to 15 moles per mole of the hydroxyl group in the oligocarbonate.

The reaction temperature may be normally from 50° to 120° C., and preferably from 60° to 100° C. The reaction is normally carried out under atmospheric pressure.

To the reaction product& so obtained is slowly added an alkali metal hydroxide, preferably sodium hydroxide, in an amount of from 0.5 to 2.0 moles per mole of the hydroxyl group of the starting oligocarbonate, whereupon the reaction product is dehydrohalogenated thereby undergoing ring closure to provide the epoxy resin according to the invention. At this stage the reaction temperature may be normally from 50° to 90° C., and preferably from 60° to 80° C., and the reaction pressure may be normally from 60 to 500 mmHg, and preferably from 90 to 500 mmHg. Water by-product is continuously removed from the reaction system as an azeotropic mixture with epihalohydrin.

CURING OF EPOXY RESIN

The so prepared epoxy resin according to the invention can be cured by a method known per se using a curing agent such a aliphatic polyamines, aromatic polyamines, dicyandiamide, polybasic carboxylic acids and anhydrides as is the case with diglycidyl ether of Bisphenol A. The curing is preferably carried out at a temperature of form room temperature to 200 ° C. for a period of from 1 to 20 hours.

The process for the production of an epoxy resin foam according to the invention will now be described in detail.

POLYEPOXY COMPOUND

In the process for the production of an epoxy resin foam according to the invention, a polyepoxy compound having at least two epoxy groups in a molecule is used as one of the essential reactants.

The polyepoxy compounds which can be used herein include, for example, epoxy resins obtained by reacting Bisphenol A, tetrabromo-'Bisphenol A', Bisphenol F or bisphenolaldehyde with epichlorohydrin.

Other usable polyepoxy compounds are glycidyl ethers and esters of those illustrated hereinafter; a polyphenol, resorcinol, hydroquinone, phthalic acid, poly (alkylene glycol) and phenol novolaks.

The polyepoxy compounds normally contain from 0.1 to 0.8 % by weight of water and from 3 to 20 mmoles per 100 g, that is, from about 5 to 6 % by weight, of an alpha-diol which has been ring-opened by water. It is believed that such water and alpha diol participate in the reaction at the time the epoxy foam is being formed in the process according to the invention. In a case wherein a dry polyepoxy compound free from water and an alpha-diol is used, water and/or an alpha-diol may be added when the dry polyepoxy compound is admixed with a carbonate oligomer.

It should be appreciated that the epoxy resin of the general formula [I] may also be utilized as a polyepoxy compound for the production of an epoxy foam.

CARBONATE OLIGOMERS

In the process for the production of an epoxy foam according to the invention, a carbonate oligomer having terminal phenolic hydroxyl groups is used as another essential reactant.

Typical carbonate oligomer which can be used herein can be represented by the following formula.

wherein Ar is an aromatic divalent residue of a phenol or bisphenol, n as determined by $^{13}$CNMR analysis is from 0 to 20, and the hydroxyl equivalent is from 100 to 2800.

The carbonate oligomer is used in an amount of from 1 to 60 parts, preferably from 5 to 30 parts by weight, based of 100 parts by weight of the polyepoxy compound.

CATALYST

Further, a catalyst is used in an amount of 0.0to 5 to 5.0 parts by weight based on 100 parts by weight of the polyepoxy compound. The catalyst may be selected from tertiary amines, imidazoles, onium salts, trialkylphosphines and triarylphosphines. Examples of the suitable catalysts include, for example, imidazoles such as 2-methylimidazole, and 2 ethyl-4-methylimidazole; onium salts such as choline chloride and tetramethylammoium choride termiary amines such as ris(N.N-dimethylaminomethyl)phenol, N.N-benzylmethylamine, 8-diazobicyclo (5,4,0) undecene and derivatives thereof; trialkylphosphines such as tri-n-propylphosphine and tri-n-butylphosphine; and triarylphosphines such as triphenylphosphine.

PROMOTER

In some cases it is preferred to add a promoter such as water and an alpha-diol in an amount of from 0.0to 1 part by weight based on 100 parts by weight of the polyepoxy compound so as to increase the amount of foaming. The alpha-diols may be alkylene glycols. Other useful promoters are polyols such as glycerol having adjacent hydroxyl groups.

OTHER ADDITIVES

If desired, fillers such as calcium carbonate, talc, barium sulface, and titanium dioxide may be added in an amount of up to 200 parts by weight based on 100 parts by weight of the polyepoxy compound so as to improve or modify properties of the resulting epoxy resin foam.

Further, it is preferred to admix an acrylic flow modifier and a silicone foam conditioner together with the polyepoxy compounds and carbonate oligomers.

METHOD OF FOAMING

In cases where the polyepoxy compound is solid, an admixture of the polyepoxy compounds, carbonate oligomers, catalysts and other components, if any, may be carried out by rolling at a temperature of from 70° to 120° C. period of up to 5 minutes. The rolled admixture is immediately cooled to room temperature. In cases where the polyepoxy compound is liquid, an admixture of the polyepoxy compounds, carbonate oligomers, catalysts and other components, if any, may be carried out by stirring.

The foaming reaction may be carried out under atmospheric or an elevated pressure at a temperature of from 120° to 240° C., preferably from 140° to 180 C., for a period of from 5 to 40 minutes, preferably from 10 to 30 minutes.

Where the polyepoxy compound is liquid, a substrate is coated or impregnated with the starting admixture, or &he admixture is poured in a mold, and the admixture is heated to an appropriate temperature together with the substrate or mold to effect foaming. Where the polyepoxy compound is particulate, a substrate is coated with the starting admixture by an electrostatic or a fluidized coating technique, or a mold is charged with the admixture, and &he admixture is heated to an appropriate temperature together with the substrate or mold to effect foaming.

When heated, the carbonate oligomer reacts and crosslinks with the polyepoxy compound to provide a copolymer, and release carbon dioxide which foams the crosslinked copolymer. In the process according to the invention, carbon dioxide is released from the carbonate oligomer which is copolymerizing with the polyepoxy compound, and thus, uniform foaming can be realized when compared with that according to the conventional process in which a separate foaming agent has to be used. The epoxy resin foam produced by the process according to the invention has enhanced mechanical properties in that it is highly flexible against compression, bending and warp.

While the density of the epoxy resin foam produced by the process according to the invention varies depending upon the amount of the carbonate oligomer used, it may be within the range of from 0.05 to 1.18 $g/cm^3$. When adhesively bonded metal, &he epoxy resin foam produced by the process according to the invention exhibits such a strong adhesion that an attempt &o peel off the epoxy resin foam from the metal may lead to a partial break of the resin material. The epoxy resin foam produced by the process according to the invention has a heat conductivity of from 0.01 to 0.5 Kcal/m.hr. ° C. , which indicates a possible application of &he foamed resin in a heat insulator.

The extent of foaming may be varied by selecting the proportion of the carbonate oligomer to the epoxy equivalent of the resin.

EFFECT OF THE INVENTION

The epoxy resin of the general formula [I] according to the invention is capable of providing tough cured produces having an increased flexural strength and an increased flexural modulus using a curing agent such as aliphatic polyamines and/or aromatic polyamines normally employed in curing of diglycidyl ether of Bisphenol A. Fur&her, the epoxy resin according to the invention is normally liquid, and thus is easy to handle upon preparation of the cured products.

In the process for the production of an epoxy resin foam according to the invention which is based on a reaction of a polyepoxy compound with a carbonate oligomer, the carbonate oligomer no& only acts as a crosslinking agent for the polyepoxy compound, but also, releases carbon dioxide, which works as a foaming agent. Consequently, the process for the production of an epoxy resin foam according to the invention ensures uniform foaming compared with a foamed product by the conventional foaming process in which a separate foaming agent has to be used besides the epoxy resin and curing agent therefor. On this account, the epoxy resin foam produced by the process according to the invention has improved mechanical properties in respect of hardness and brittleness. Thus the epoxy resin foam produced by the process according to the invention is excellent in mechanical durability, heat resistance and adhesiveness, and is useful as vibration dampers, anticorrosive materials, heat insulators and shock absorbers.

Further, the process for the production of an epoxy resin foam according to the invention does not require a separate foaming agent besides the polyepoxy compounds and crosslinking agents therefor, which renders the foaming process simpler than the conventional ones.

The present invention will be further described by the following Examples, Reference Examples and Comparative Examples. It should be appreciated that the invention is not restricted to those in the Examples.

EXAMPLE 1

Epoxy resin and its preparation

To a two liter three necked flask equipped with a stirrer, thermometer and condenser was charged with 252 g (0.885equivalent of OH group) of oligocarbonate represented by the formula [II]'

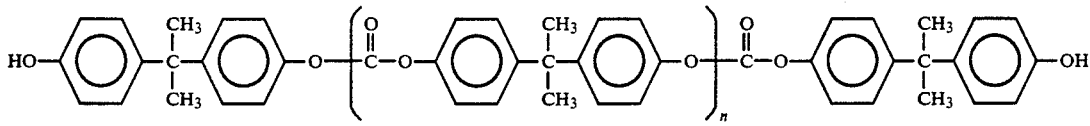

having a number average molecular weight of 570 (n=2.0 on average) and a Bisphenol A content of 22 by weight, 1154g (12.48 moles) of epichlorohydrin and 0.911 g (0.008 mole) of tetramethylammonium chloride, and heated at a temperature of 95° C. for a period of 5 hours.

A water-removing device was then mounted on the three-necked flask, and 50 g (1.33 moles) of solid sodium hydroxide was portionwise added to the flask over a period of 2 hours, during which the reaction temperature and pressure were set at 70° C., and 150 mmHg, respectively, and water by-produced was continuously removed from the flask azeotropically together with epichlorohydrin.

The excess epichlorohydrin which had remained unreacted in the flask was recovered by distillation under reduced pressure. Thereafter, 300 g of xylene was added to the flask to extract the reaction products, and insolubles such as inorganic salts were removed by filtration.

The filtrate so obtained was dropwise added to a 20 % by weight aqueous solution of monosodium phosphate under vigorous stirring at a temperature of from 0° to 5° C. The solution obtained was divided into an aqueous and an organic phases. The organic phase was recovered, and residual water was azeotropically removed with xylene. The liquid so obtained was filtered through a G4 glass filter, then xylene was removed therefrom by distillation under reduced pressure to provide 84 g of a viscous pale yellow liquid.

The viscous liquid had an epoxy equivalent of 292 and a viscosity of 76,000 cps at 2° C. The infrared absorption spectrum of the liquid is shown in FIG. 1. From these results the viscous pale yellow liquid was identified as being an epoxy resin comprising a structure represented by the formula [II]

REFERENCE EXAMPLE 1

A mixture of 30 g of the epoxy resin prepared in Example 1 and 2.5 g of triethylenetetramine (TTA) as a curing agent (8.4 parts by weight of the curing agent per 100 parts by weight of the epoxy resin) was kept at room temperature for 16 hours and then at 100° C. for 2 hours to prepare a cured epoxy resin.

The cured epoxy resin so obtained was tested for various properties in accordance with JIS K 891. The results are shown in Table 1.

TABLE 1

|  | Reference Example 1 | Comparative Example 1 |
| --- | --- | --- |
| Epoxy resin used | Epoxy resin of Example 1 | Epomik R-140P |
| Composition (Parts by weight) |  |  |
| Epoxy resin | 100 | 100 |
| Curing agent (TTA) | 8.4 | 12.9 |
| Properties of cured resin |  |  |
| Heat distortion temperature (°C.) | 102 | 110 |
| Flexural strength (Kgf/mm$^2$) | 12.2 | 10.6 |
| Flexural strength (Kgf/mm$^2$) | 391 | 297 |
| Compression strength (Kgf/mm$^2$) | 13.1 | 10.1 |

COMPARATIVE EXAMPLE 1

A mixture of Epomik R-140P (the trade name of a Bisphenol A based epoxy resin having an epoxy equivalent of 188supplied by MITSUI Petrochemical Industries, Ltd.) and 3.9 g of triethylenetetramine (TTA) as a curing agent (12.9 parts by weight of the curing agent per 100 parts by weight of the epoxy resin) was cured as described in Reference Example 1. The cured epoxy resin so obtained was tested as in Reference Example 1 for various properties in accordance with JIS K 8911. The results are shown in Table 1.

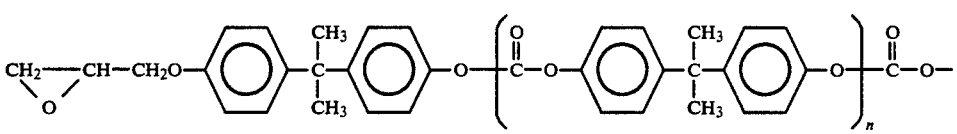

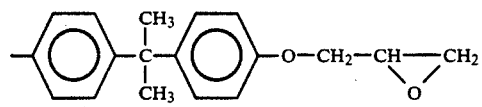

wherein n is 2 on average.

EXAMPLE 2

Production of epoxy resin foam

|  | Parts by weight |
| --- | --- |
| a Bisphenol A based solid epoxy resin having an epoxy equivalent of 920 and the softening point of 95° C. | 100 |
| a Bisphenol A based carbonate oligomer having a hydroxyl equivalent of 320 and the softening point of 76° C. | 30 |
| a Catalyst consisting essentially of 2-methylimidazole | 0.5 |
| an Acrylic flow modifier | 0.5 |
| a Silicone foam conditioner | 0.1 |

A mixture of the above ingredients was kneaded with 8 inch rolls heated at a temperature of 110° C. for a period of 3 minutes. The kneaded mixture was then cooled to room temperature, pulverized and classified through a sieve of 10 mesh.

The pulverulent mixture so obtained was foamed in accordance with the following procedures (a) and (b).

Procedure (a)

A mold of an effective cavity of 10 cm ×10 cm×5 cm coated with a releasing agent on the surface of the cavity was filled with 100 g of the pulverulent mixture above, and heated at a temperature of 150° C. for a period of 30 minutes &o produce a rectangular foam.

The epoxy resin foam so produced had uniform independence cells which were not destroyed upon compression. The foamed resin exhibited a bending warp (a warp in response to a bending load) of as large as 6.0 m. This is in contrast to a bending warp of 2.6 mm exhibited by an epoxy resin foam produced in Comparative Example 2 (c).

The epoxy resin foam so produced was tested for various properties. The results are shown in Table 2.

Procedure (b)

A steel plate having a thickness of 1 mm was preheated to a temperature of 130° C. and coated with the above described pulverulent mixture in a thickness of 0.5 mm, by means of an electrostatic coater. The coating was heated together with the steel plate at a temperature of 150° C. for 15 minutes. A resilient foamed coating of a thickness of about 2.5 mm was formed on the steel plate.

The foamed coating had a smooth surface and the cross-section of the coating revealed a very uniform foamed structure.

The foamed coating was tested for various properties. The results are shown in Table 3.

EXAMPLE 3

Production of epoxy foam

|  | Parts by weight |
| --- | --- |
| a Bisphenol A based solid epoxy resin having an epoxy equivalent of 920 and the softening point of 95° C. | 100 |
| a Bisphenol A based carbonate oligomer having a hydroxyl equivalent of 635 and the softening point of 101° C. | 62 |
| a Catalyst consisting essentially of triphenylphosphine | 1.0 |
| a Flow modifier | 0.5 |
| a Foam conditioner | 0.1 |

A mixture of the above ingredients was kneaded with two 8-inch rolls heated at a temperature of 110° C. for a period of 2.5 minutes. The kneaded mixture was immediately cooled to room temperature, pulverized and classified through a sieve of 100 mesh.

The pulverulent mixture so obtained was foamed as described in Procedure (a) of Example 2.

The epoxy resin foam so produced was tested for various properties. The results are shown in Table 2.

EXAMPLE 4

Production of epoxy resin foam

Example 3 was repeated except that 70 parts by weight of particulate silicon dioxide were additionally used as a filler.

The epoxy resin foam so produced was tested for various properties. The results are shown in Table 2.

EXAMPLE 5

Production of epoxy resin foam

|  | Parts by weight |
| --- | --- |
| a Tetrabromo-Bisphenol A based epoxy resin having an epoxy equivalent of 690 and a bromine content of 23% by weight | 50 |
| a Bisphenol A based solid epoxy resin having an epoxy equivalent of 820 and the softening point of 88° C. | 50 |
| a Bisphenol A based carbonate oligomer having a hydrol equivalent of 320 and the softening point of 76° C. | 30 |
| a Particulate silica treated with a coupling agent | 50 |
| Antimony trioxide | 3.0 |
| a Catalyst consisting essentially of 2-ethyl-4-methylimidazole | 1.0 |
| a Silicone foam conditioner | 0.1 |

A mixture of the above ingredients was kneaded with two 8-inch rolls heated at a temperature of 110° C. for a period of 3 minutes. The kneaded mixture was then cooled to room temperature and pulverized. The pulverulent mixture so obtained was foamed as described in procedure (a) of Example 2.

The epoxy resin foam so produced was tested for various properties. The results are shown in Table 2. The foamed product exhibited a flame retardancy rating of V-0.

EXAMPLE 6

Production of epoxy resin foam

|  | Parts by weight |
| --- | --- |
| a Bisphenol A based solid epoxy resin having an epoxy equivalent of 189 and a vicosity of 130 poises at 25° C. | 85 |
| a Reactive diluent trade name of R-093, supplied by | 15 |

-continued

|  | Parts by weight |
|---|---|
| MITSUI Petrochemical Industries, Ltd. | |
| a Bisphenol A based carbonate oligomer having a hydroxyl equivalent of 300 and the softening point of 72° C. | 20 |
| a Catalyst consisting essentially of 2-ethyl-4-methylimidazole (2E4MZ, supplied by SHIKOKU Chemical Industries Co., Ltd.) | 2.0 |
| a Silicone foam conditioner | 0.1 |

The ingredients listed above were mixed together in a beaker at a temperature of 70° C. to provide a liquid of a viscosity of about 10 posies which was pourable into a mold. The liquid mixture (200 g) was poured into a mold of 10 cm × 10cm × 5 cm preheated to a temperature of 150° C., and the mold was placed in an oven maintained at a temperature of 150° C. For a period of 40 minutes. An epoxy resin foam having a shape and size substantially corresponding to those of the mold cavity was produced.

The epoxy resin foam so produced was tested for various properties. The results are shown in Table 2.

EXAMPLE 7

Production of epoxy foam

|  | Parts by weight |
|---|---|
| a Phthalic acid based liquid epoxy resin having an epoxy equivalent of 193 and a viscosity of 3800 cps at 25° C. | 100 |
| a Bisphenol A based carbonate oligomer having a hydroxyl equivalent of 300 and the softening point of 72° C. | 15 |
| a Catalyst consisting essentially of Tris(N.N-dimethylaminomethyl)phenol | 1.0 |
| a Silicone foam conditioner | 0.1 |

The ingredients listed above were mixed together in a beaker at a temperature of 70° C. to provide a liquid of a viscosity of about 6 poises. As in Example 6, 200 g of the liquid mixture was poured into a mold, and foamed by heating the mold in an oven maintained at a temperature of 150° C. for a period of 40 minutes.

The epoxy resin foam so produced was tested for various properties. The results are shown in Table 2.

COMPARATIVE EXAMPLE 2

|  | Parts by weight |
|---|---|
| a Bisphenol A based epoxy resin having an epoxy equivalent of 920 and a softening point of 95° C. | 100 |
| a Crosslinking agent dicyandiamide | 5 |
| a Foaming agent dinitrosopentamethylenetetramine/urea | 5 |
| compound (Cellular/Cell paste K5, supplied by EIWA Chemical Industries Co., Ltd.) | |
| a Catalyst consisting essentially of 2-methylimidazole | 1.0 |
| an Acrylic flow modifier | 0.5 |
| a Silicone foam conditioner | 0.1 |

A mixture of the above ingredients was kneaded with two 8-inch rolls heated at a temperature of 110° C. for a period of 3 minutes. The kneaded mixture was then cooled to room temperature, pulverized and classified through a sieve of 150 mesh.

The pulverulent mixture so obtained was foamed in accordance with the following procedures (c) and (d).

Procedures (c)

Following Procedure (a) of Example 2, 100 g of the pulverulent mixture was foamed.

The epoxy foam so produced was tested for various properties. The results are shown in Table 2.

Procedure (d)

A steel plate having a thickness of 1 mm was preheated to a temperature of 130° C. and coated with the above described pulverulent mixture in a thickness of 0.35 mm, by means of an electrostatic coater. The coating was heated together with the steel plate at a temperature of 150° C. for 15 minutes. A resilient foamed coating of a thickness of about 2.5 mm was formed on the steel plate.

The foamed coating was tested for various properties. The results are shown in Table 3.

COMPARATIVE EXAMPLE 3

|  | Parts by weight |
|---|---|
| a Bisphenol A based liquid epoxy resin having an epoxy equivalent of 189 and a viscosity of 130 poises at 25° C. | 85 |
| a Reactive diluent trade name of R-093. supplied by MITSUI Petrochemical Industries, Ltd | 15 |
| a Catalyst consisting essentially of 2-ethyl-4-methylimidazole (2E4MZ, supplied by SHIKOKU Chemical Industries Co., Ltd.) | 4.0 |
| a Foaming agent consisting essentially of azoicarbonamide/urea compound (Vinyol AC/Cell paste 101, supplied by EIWA Chemical Industries Co., Ltd.) | 3.0 |
| a Silicone foam conditioner | 0.1 |

The ingredients listed above were mixed together in a beaker. The liquid mixture (200 g) so obtained was foamed in a mold preheated to a temperature of 150° C., as in Example 6.

The epoxy foam so produced was tested for various properties. The results are shown in Table 2.

TABLE 2

|  | Ex. 2 (a) | Ex. 3 | Ex. 4 | Ex. 5 | Ex. 6 | Ex. 7 | Comp. Ex. 2 (c) | Com. Ex. 3 |
|---|---|---|---|---|---|---|---|---|
| Density (g/cm$^3$) | 0.20 | 0.22 | 0.26 | 0.20 | 0.25 | 0.30 | 0.18 | 0.23 |
| Flexural strength (Kgf/cm$^2$) | 35 | 32 | 26 | 28 | 148 | 83 | 62 | 18 |
| Young's modulus (Kgf/cm$^2$) | 510 | 460 | 520 | 550 | 1390 | 1510 | 740 | 1600 |
| Bending warp (mm)*[1] | 6.0 | 7.2 | 4.8 | 5.0 | 2.5 | 3.6 | 2.6 | 0.6 |
| Compression strength (Kg/cm$^2$) | 38 | 34 | 38 | 30 | 137 | 104 | 85 | 25 |

TABLE 2-continued

|  | Ex. 2 (a) | Ex. 3 | Ex. 4 | Ex. 5 | Ex. 6 | Ex. 7 | Comp. Ex. 2 (c) | Com. Ex. 3 |
|---|---|---|---|---|---|---|---|---|
| Heat conductivity (Kcal/m h °C.) | 0.043 | 0.048 | 0.056 |  |  |  | 0.035 |  |
| % of independent cells | 93.8 |  |  |  |  | 88.6 |  |  |
| Water absorption*2 (%) | 1.2 | 1.4 | 0.8 | 1.4 | 0.7 | 0.5 | 1.0 |  |
| Glass transition temp. (%) | 98 | 89 | 90 |  | 96 | 106 | 112 |  |
| Flame retardancy |  |  |  | V—O |  |  |  |  |

*1 Warp amount at break at measurement of bending strength according to JIS K 6911
*2 Dipped for 3 days at 21° C.

TABLE 3

|  | Ex. 2 (b) | Comp. Ex. 2 (d) |
|---|---|---|
| Adhesion strength (Kgf/cm²) | 16 (note 1) | 28 (note 1) |
| Ultimate angle of bending (degree) | 30 | 5 |
| (Anticorrosion) |  |  |
| Dipped in 3% saline*2 | No rust | No rust |
| Salt spray*3 | No rust | No rust |
| (Antichemical)*4 |  |  |
| 5% NaOH | No change | No change |
| 5% H2SO4 | No change | No change |
| 10% acetic acid | No change | No change |
| Toluene | Swollen | No change |

Note 1: Material broken
*1 Mandrel 8 mm O
*2 Dipped for 7 days at 21° C.
*3 35° C., 200 hours
*4 Dipped for 7 days at 21° C.

EXAMPLE 8

Production of epoxy resin foam

Example 2(a) were repeated except that where were used the carbonate oligomer in an amount of 40 parts, 15 parts and 7.6 parts, by weight, respectively.

The foamed products so obtained and the product of Example 2(a) were tested for example of foaming (times by volume), density, flexural strength, flexural modulus, compression strength and heat conductivity. The results are shown in Table 4.

Table 4 reveals that &he extent of foaming can be varied by changing the amount of the carbonate oligomer.

Incidentally, in order to achieve high extent of foaming by incorporation of at least 30 parts by weight of the carbonate oligomer having a hydroxyl equivalent of 800 and a softing point of 72° C., per 300 parts by weight of the polyepoxy compound, it is necessary to use a promotor such as water or an alpha diol.

TABLE 4

| Parts by weight of oligocarbonate | 40 | 30 Ex. 2 (a) | 15 | 7.5 |
|---|---|---|---|---|
| Extent of foaming (times by volume) | 4.6 | 6.0 | 3.2 | 1.5 |
| Density (g/cm³) | 0.26 | 0.20 | 0.38 | 0.78 |
| Flexural strength (kgf/cm²) | 40 | 35 | 132 | 400 |
| Bending modulus (kgf/cm²) | 550 | 510 | 1820 | 8600 |
| Compression strength (kgf/cm²) | 42 | 38 | 140 | 390 |
| Heat conductivity | 0.040 | 0.043 | 0.068 | 0.105 |

TABLE 4-continued
(Kcal/m.h. °C.)

We claim:

1. A process for the production of an epoxy resin foam which comprises the steps of:
   (1) admixing a polyepoxy compound having at least two epoxy groups in the molecule, a carbonate oligomer represented by the formula:

wherein Ar is an aromatic divalent residue of a phenol or bisphenol, n, as determined by $^{13}$CNMR analysis, is from 0 to 20, and the hydroxyl equivalent is from 100 to 2800, and a catalyst, and thereafter foaming the admixture by
   (2) reacting the polyepoxy compound with the carbonate oligomer in the presence of a catalyst selected from the group consisting of tertiary amines, imidazoles, onium salts, trialkylphosphines and triarylphosphines at a temperature of from 120° to 240° C. to produce an epoxy resin foam.

2. The process according to claim 1 wherein said polyepoxy compound is an epoxy resin obtained by reacting Bisphenol A, tetrabromo-Bisphenol A, Bisphenol F and/or a bisphenolaldehyde with epichlorohydrin.

3. The process according to claim 1 wherein said polyepoxy compound is a glycidyl ether or an ester of a polyphenol, resorcinol, hydroquinone, phthalic acid poly (alkylene glycol) or a phenol novolak.

4. A process according to claim 1 wherein the carbonate oligomer is used in an amount of from 1 to 60 parts based on 100 parts by weight of the polyepoxy compound.

5. A process according to claim 1 wherein the polyepoxy compound contains from 0.1 to 0.8% by weight of an alpha-diol; and the reaction is conducted using the carbonate oligomer as a crosslinking agent and the epoxy resin produced is foamed by the carbon dioxide released during reaction such that an additional foaming agent is not required.

6. A process according to claim 1 wherein the polyepoxy compound is solid at room temperature; and a mixture of the polyepoxy compound, the carbonate oligomer and the catalyst is rolled at a temperature of 70° to 130° C. and is then cooled and pulverized before the foaming reaction.

* * * * *